United States Patent Office 3,471,257
Patented Oct. 7, 1969

3,471,257
PROCESS FOR CARRYING OUT ISOTOPIC EXCHANGE BETWEEN AMMONIA AND DEUTERATED AMMONIA, HYDROGEN AND DEUTERIUM
Yves Bourgeois, Vermelles, Jean-Yves Lehman, Mazingarbe, Bernard Lefrancois, Bully-les-Mines, Michel Briec, Grenoble, and Michel Rostaing, Meylan, France, assignors to Houilleres du Bassin du Nord & du Pas-de-Calais, Commissariat a l'Energy Atomique, L'Air Liquide, Societe pour l'Etude et l'Exploitation des Procedes Georges Claude, and Compagnie de Construction Mecanique Procedes Sulzer, all of Paris, France and all companies of France
Filed July 28, 1967, Ser. No. 656,907
Claims priority, application France, Aug. 16, 1966, 73,200; Oct. 17, 1966, 80,236
Int. Cl. C01c 1/00
U.S. Cl. 23—193    5 Claims

ABSTRACT OF THE DISCLOSURE

Monothermal process for carrying out isotope exchange between ammonia, deuterated ammonia, hydrogen and deuterium in which the exchanger which provides the ammonia richest in deuterated ammonia is maintained at a temperature from 10° to 100° C. higher than the temperature of the other exchanger.

---

This invention relates to an improved process for carrying out isotope exchange, in particular between ammonia, deuterated ammonia, hydrogen and deuterium.

The exchange of deuterium between ammonia and hydrogen may be expressed as follows:

$$NH_3 + HD \rightleftharpoons NH_2D + H_2$$

There are two systems for exploiting this reaction which are generally designated the "bithermal process" and the "monothermal process," according to the enriching method chosen. The basic difference between the two processes is that in the bithermal process the ammonia gains deuterium in one of the exchangers (the cold exchanger) and loses it in the other (the hot exchanger), the point richest in deuterated ammonia being between the two exchangers, whereas in the monothermal process the ammonia gains deuterium in the two exchangers arranged in series, firstly by contact with the synthesis gases and then by contact with the gases resulting from cracking of the enriched ammonia.

We have now found that the monothermal process can be improved by using different temperatures in the two successive exchangers and according to the present invention we provide, in a process for effecting isotope exchange between ammonia, deuterated amomnia, hydrogen and deuterium by the monothermal process, the improvement which comprises maintaining the exchanger which provides the ammonia richest in deuterated ammonia at a temperature of from 10° to 100° C. higher than the temperature of the other exchanger.

Figure 1:
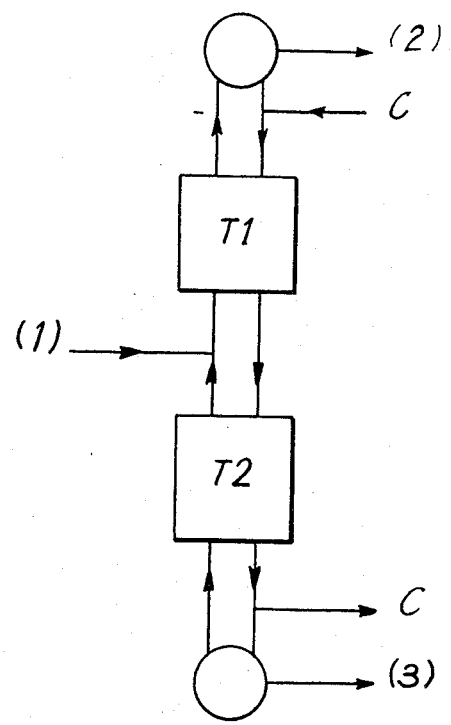
Figure 2:
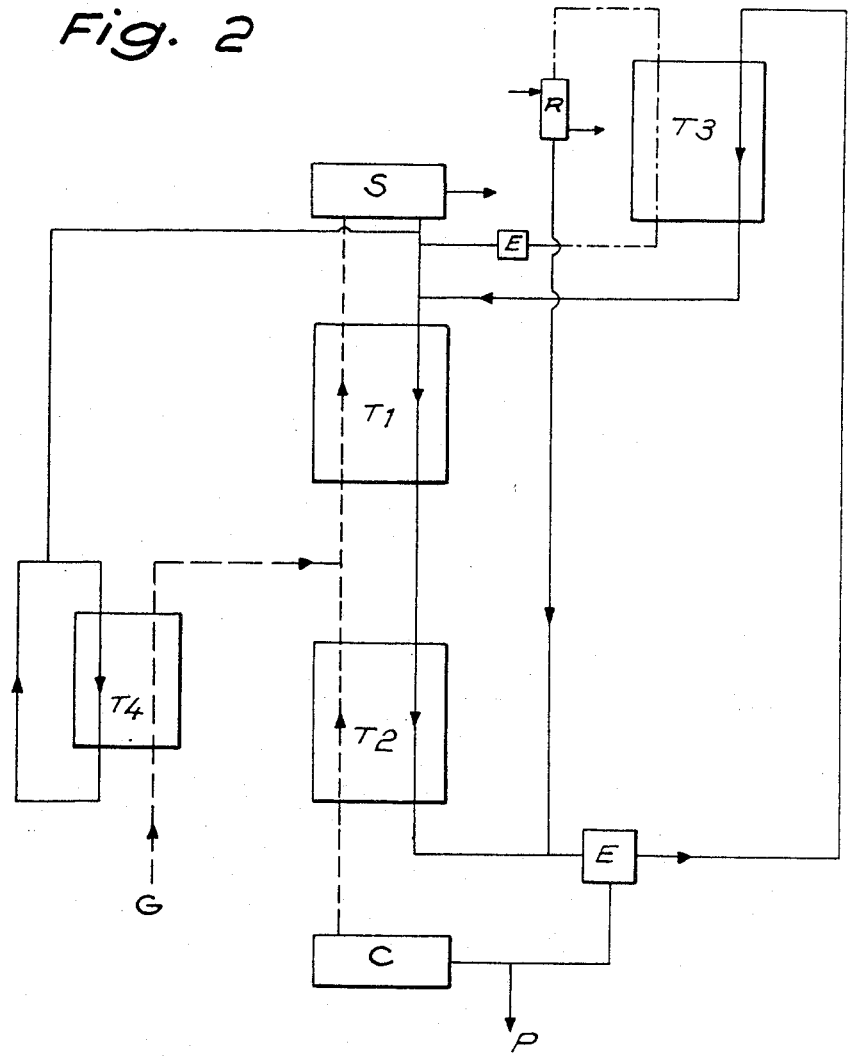
Figure 3:
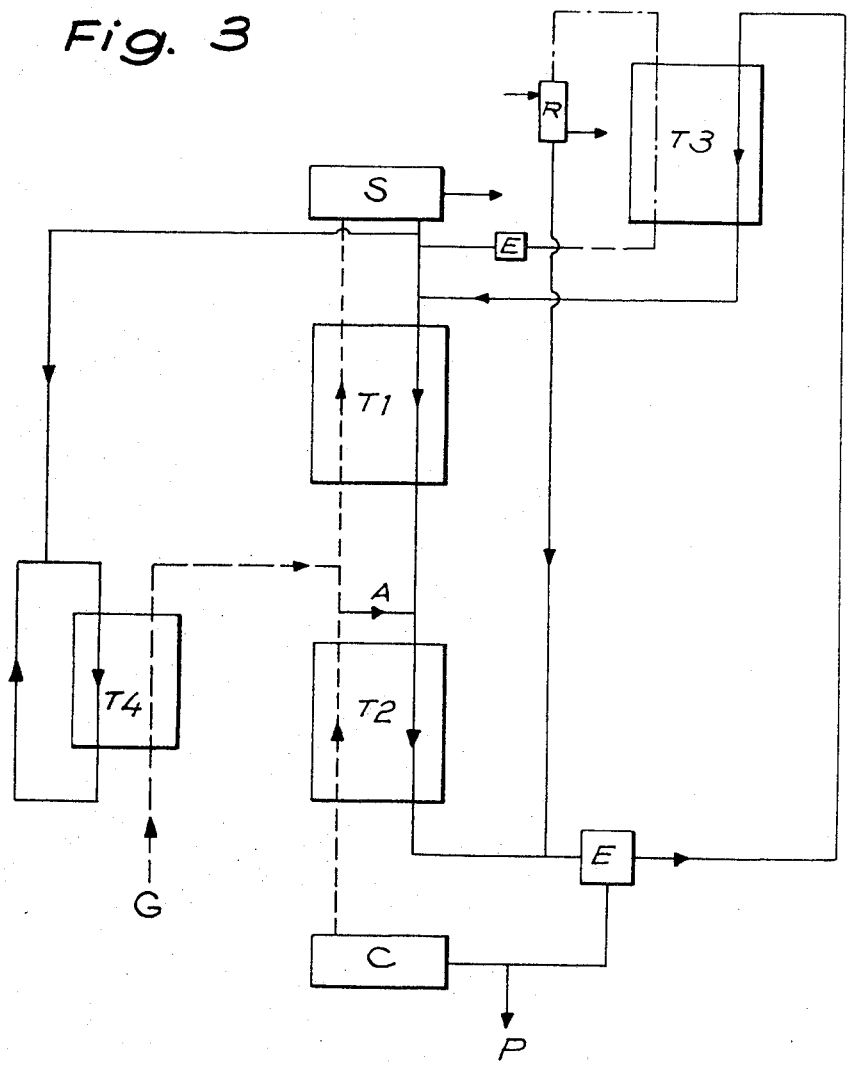
Figure 4:
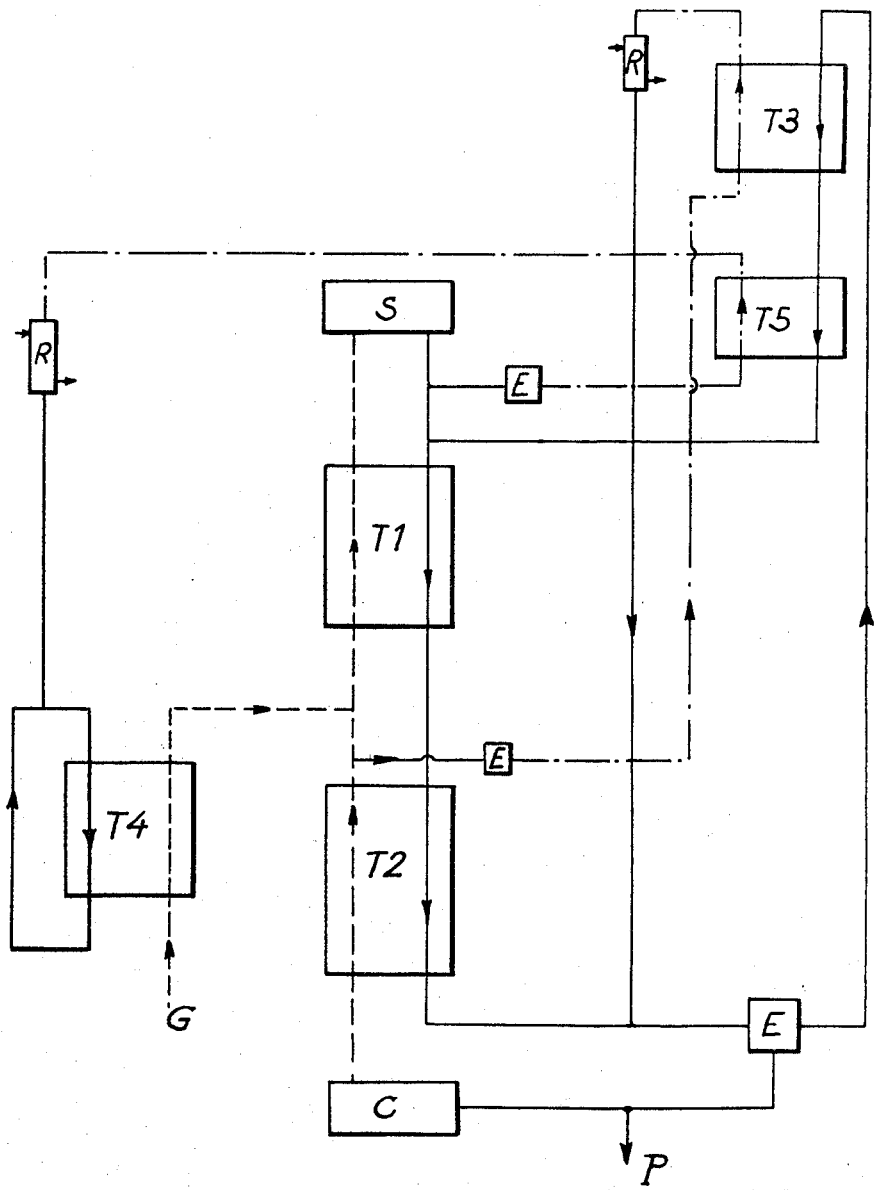
Figure 5:
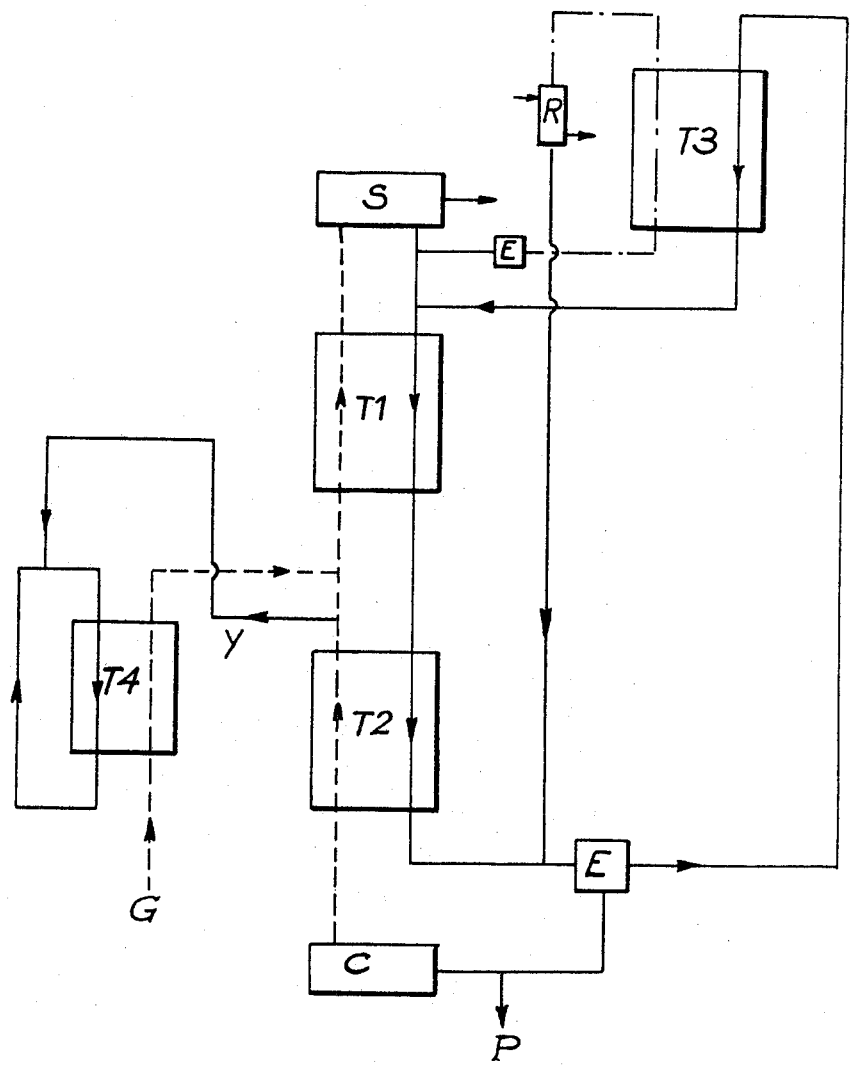

For a better understanding of the invention, reference will now be made by way of illustration only to the accompanying drawings, in which:

FIGURE 1 is a general simplified diagram of an isotope exchange plant for the monothermal process, FIGURE 2 shows a diagram of an isotope exchange plant for the modified monothermal process, FIGURE 3 shows a diagram of a modified monothermal plant in which the ammonia condensed from the gases from the warmer tower is recycled directly to the ammonia entering this tower, FIGURE 4 shows a different recycling process in which the deuterated ammonia is enriched with deuterium by contact in an adjacent isotope exchanger with richly deuterated ammonia, FIGURE 5 shows a different recycling process in which the deuterated ammonia serves to enrich with deuterium the fresh gases from the synthesis gas plant.

FIGURE 1 shows the two exchange towers $T_1$ and $T_2$, the cracking plant, the amomnia synthesis plant, the inlet 1 for the fresh gases, the ammonia outlet 2 and deuterium outlet 3 and the inlet and outlet for the catalyst. Hitherto, in the monothermal process, the temperatures in the two isotope exchange towers $T_1$ and $T_2$ have been the same, hence the term "monothermal." We have now found that considerable industrial advantages can be obtained by operating at different temperatures in the two towers.

There are three reasons for this phenomenon. Firstly, since the coefficient of isotope exchange between ammonia and hydrogen increases as the temperature falls, the exchange temperature in the tower $T_1$ must be very low to give good impoverishment of the gases leaving this tower while retaining a reasonable reflux rate. Secondly, the efficiency of the exchanger plates drops sharply when the temperature decreases. Lastly, the two exchangers operate under very different fluid flow conditions, the mass rates of gas and liquid flow in the exchanger $T_2$ being substantially identical whereas the mass rate of liquid flow is much lower than the mass rate of gas flow in exchanger $T_1$.

The examples given below illustrate the advantage obtained by means of the process of the invention. This advantage is that, for a slight increase in the number of effective plates in the exchanger $T_1$, there is a large reduction in the number of effective plates needed in exchanger $T_2$ when the latter operates at a temperature exceeding that in exchanger $T_1$ by 10 to 100° C. If the synthesis gases are to have a low deuterium content when leaving $T_1$, the temperature in this exchanger must be very low (−40° C., for example). A fairly small proportion (approximately ⅙) of the gases entering this exchanger come from ammonia cracking and a large proportion (approximately ⅚) from the adjacent hydrocarbon cracking plant. For a given level of liquid ammonia introduced into $T_1$ the number of effective exchange plates will, of course, depend on the deuterium content of the inlet gases, which itself depends substantially on the deuterium content of the fresh gases (resulting for example from hydrocarbon cracking) rather than on the deuterium content of the gases resulting from ammonia cracking. Consequently, the deuterium content of the gases leaving $T_1$ and resulting from ammonia cracking can be increased without requiring a substantial increase in the number of effective plates in exchanger $T_1$.

However, this possibility of increasing the deuterium content of the gases leaving exchanger $T_2$ means that, for a similar overall yield, the temperature in the exchanger $T_2$ may be higher than that in exchanger $T_1$, considerably increasing the efficiency of this tower and reducing the number of effective plates in it.

On the other hand, with this operating method the gases leaving the warmer tower have a high content of slightly deuterated ammonia, and, in accordance with the invention, at least some of this ammonia is recovered and recycled at suitable places in the plant. The invention therefore also relates to processes for recycling deuterated ammonia obtained by condensation from the gases leaving the tower with the higher operating temperature.

In order that the invention may be more fully understood, the following examples are given by way of illustration only.

Example 1

If the deuterium level is fixed at 0.2 (the arbitrary level 1 being that of the fresh gases resulting, for example, from hydrocarbon cracking) for the gas leaving exchanger $T_1$, and 100 for the ammonia leaving exchanger $T_2$, and if the weight rates of flow for the liquid and gas in the exchanger $T_1$ and from 1 to 5, application of the conventional monothermal process (with the same temperature of $-40°$ C. in both exchangers) requires 51 effective plates in $T_1$ and 80 effective plates in $T_2$.

With the same extreme conditions as regards the deuterium content of the gases and ammonia, the same types of exchange towers, and the same ammonia recycling rate, but with an operating temperature of $-40°$ C. in $T_1$ and $0°$ C. in $T_2$, the exchangers used contained 58 effective plates in $T_1$ and 16 effective plates in $T_2$.

By means of the process of the invention, therefore, 64 plates can be saved in exchanger $T_2$ by using 7 additional plates in exchanger $T_1$.

Example 2

If the deuterium rate is fixed at 0.25 (the arbitrary rate 1 being that of the fresh gases resulting for example from hydrocarbon cracking) for the gas leaving the exchanger $T_1$ and 100 for the ammonia leaving the exchanger $T_2$, and if the weight rates of flow of the liquid and gas in the exchanger $T_1$ are from 1 and 4.5, the results given in Table I are obtained.

TABLE I

| Process used | Number of effective plates for the same type of tower | |
| --- | --- | --- |
| | $T_1$ | $T_2$ |
| Conventional monothermal at— | | |
| $-40°$ C | 37 | 72 |
| $-25°$ C | 35 | 38 |
| Process according to the invention: | | |
| $T_1$ at $-40°$ C., $T_2$ at $0°$ C | 40 | 14 |
| $T_1$ at $-30°$ C., $T_2$ at $0°$ C | 37 | 14 |

The examples given above are by no means restrictive. For example, the temperature of $T_1$ may vary over a wide range, for example from $-10$ to $-70°$ C., and that of $T_2$ may vary from $-40°$ to $+60°$ C. The maximum possible temperature in exchanger $T_2$ should theoretically correspond to an isotope exchange coefficient equal to unity, but it must of course be optimised according to the temperature of $T_1$ and the reflux into the exchanger, in order to take into account the opposite directions of the variations at this temperature in the isotope exchange coefficient and the plate efficiency.

According to the invention, the recycling of deuterated ammonia obtained by condensation from the gases leaving the tower with the higher operating temperature may be carried out in various ways as illustrated in FIGURES 3, 4 and 5. These figures show the inlet G for the synthesis gases coming, for example, from a hydrocarbon cracking plant, or from coke-oven recovery gases; isotope exchange towers $T_1$, $T_2$, $T_3$, $T_4$ and $T_5$ for carrying out the process (while the general process used is of the monothermal type, the temperatures in the main towers $T_1$ and $T_2$ are different, the temperature of $T_2$ being between 10 and $100°$ C. above that in $T_1$; $T_3$ and $T_5$ are isotope exchange towers for recovering the deuterium contained in the ammonia for recycling the catalyst; and $T_4$ is a tower for saturating the fresh gases with ammonia); evaporators E; cooler-condensers R; a deuterated ammonia cracking plant C; a plant S for synthesising ammonia from the fresh gases and recycled gases; and an extraction point P for the deuterated ammonia.

In the embodiment shown in FIGURE 3, the deuterated ammonia leaving the tower $T_2$ is condensed and re-injected into the condensed ammonia entering this tower.

In the embodiment in FIGURE 4, the condensate is vaporised and used instead of the poor ammonia in tower $T_3$. In this case, however, since the deuterium content of this condensate is not negligible (being in equilibrium with the gas leaving tower $T_2$), the concentrated solution of catalyst in the ammonia will be less impoverished on passing through $T_3$ than in the general case illustrated in FIGURE 2 (since in this case this concentrated solution of catalyst is impoverished by using ammonia with a very low deuterium content coming directly from the synthesis plant S). The impoverishment is completed by using the ammonia required for saturating the feed gases G. When vaporised, this poor ammonia circulates in countercurrent in the solution previously impoverished, in a tower $T_5$, before going to $T_4$ to saturate the feed gas. The concentrated solution of catalyst in the ammonia is therefore impoverished as in the general case illustrated in FIGURE 2. However, since the ammonia required for the counter-current in $T_3$ is not extracted, less ammonia is drawn off at the outlet from the synthesis plant, and it is possible either to substantially reduce the number of contact plates in tower $T_1$ (for an identical rate of flow of ammonia for cracking) or to substantially reduce the cracking rate (for the same number of contact plates in tower $T_1$). This embodiment involves the use of an auxiliary exchange tower, but this tower is relatively small and the operating costs (for vaporisation and condensation of the saturation ammonia) are low. Obviously, the temperatures in the towers $T_1$ and $T_2$ must be such as to give satisfactory rates of flow in towers $T_3$ and $T_5$. However, if the rates of flow of ammonia vapour (condensate and humidity of the feed gas) are too low, they can be improved by adding poor ammonia extracted from the outlet of the synthesis plant and vaporised.

Another embodiment of the process according to the invention is illustrated in the diagram in FIGURE 5. Here the feed gas G is saturated with the condensate in the tower $T_4$ instead of using the poor ammonia from the outlet of the synthesis plant. Since less ammonia is drawn off at the outlet of the synthesis plant, it is possible either to reduce the number of contact plates in tower $T_1$ (for the same rate of flow of ammonia for cracking) or to substantially reduce the cracking rate for an equivalent number of contact plates in the towers. Obviously, this modification is more useful if the plant is operating at a lower pressure, since the quantity of ammonia required for saturating the gas is then higher.

What we claim is:

1. In a process for effecting isotope exchange between ammonia, hydrogen and deuterium by the monothermal process in which there is employed an exchanger richer in deuterated ammonia than another exchanger, the improvement which comprises maintaining the exchanger which provides the ammonia richest in deuterated ammonia at a warmer temperature of from $10°$ to $100°$ C. higher than the temperature of the other exchanger.

2. A process according to claim 1, in which the deuterated ammonia contained in the gases leaving the warmer exchanger is partially condensed and recycled in the installation in order to recover the deuterium contained therein.

3. A process according to claim 2, in which the condensed deuterated ammonia is injected into the gases entering the warmer exchanger.

4. A process according to claim 2, in which the condensed deuterated ammonia is subjected, after vaporisation, to isotope exchange by contact with a concentrated solution of a catalyst and is then, after condensation, recycled into the ammonia leaving the warmer exchanger.

5. A process according to claim 2, in which the condensed deuterated ammonia is used in an auxiliary exchanger to saturate the feed gases with deuterated ammonia.

References Cited
UNITED STATES PATENTS

| | | | |
|---|---|---|---|
| 2,895,803 | 7/1959 | Sperack | 23—204 |
| 3,233,971 | 2/1966 | Delassus et al. | 23—204 |

OSCAR R. VERTIZ, Primary Examiner

HOKE S. MILLER, Assistant Examiner

U.S. Cl. X.R.

23—204, 210, 283

UNITED STATES PATENT OFFICE
CERTIFICATE OF CORRECTION

Patent No. 3,471,257                                October 7, 1969

Yves Bourgeois et al.

It is certified that error appears in the above identified patent and that said Letters Patent are hereby corrected as shown below:

Column 3, line 21, "and" should read -- are --. Column 4, line 64, before "hydrogen" insert -- deuterated ammonia, --.

Signed and sealed this 6th day of January 1970.

(SEAL)
Attest:

Edward M. Fletcher, Jr.
Attesting Officer

WILLIAM E. SCHUYLER, JR.
Commissioner of Patents